United States Patent [19]

Hare et al.

[11] Patent Number: 4,502,287
[45] Date of Patent: Mar. 5, 1985

[54] REFRIGERATION SYSTEM ALARM DEVICE

[75] Inventors: Harold L. Hare, Duncan; John M. Bell, Moore, both of Okla.

[73] Assignee: Safe-T-Frezz, Inc., Duncan, Okla.

[21] Appl. No.: 514,943

[22] Filed: Jul. 18, 1983

[51] Int. Cl.³ .............................................. F25B 49/00
[52] U.S. Cl. ........................................ 62/126; 62/236; 361/29; 361/92
[58] Field of Search ................ 62/127, 126, 158, 236; 361/22, 92

[56] References Cited

U.S. PATENT DOCUMENTS

| | | |
|---|---|---|
| D. 242,024 | 10/1976 | Wang et al. |
| 2,439,331 | 4/1948 | Bean |
| 2,475,069 | 7/1949 | Wood |
| 2,489,906 | 11/1949 | Kuhn |
| 2,535,278 | 12/1950 | Fletcher |
| 2,683,970 | 7/1954 | Jacobs |
| 3,028,586 | 4/1962 | Reda |
| 3,491,544 | 1/1970 | Webber |
| 3,508,236 | 4/1970 | Adams |
| 3,594,752 | 7/1971 | Alton |
| 3,933,120 | 1/1976 | Ollis |
| 3,959,787 | 5/1976 | Messmann et al. |
| 3,974,660 | 8/1976 | Farr ........................... 62/236 X |
| 3,976,458 | 8/1976 | Krug ........................... 62/236 X |
| 4,002,397 | 1/1977 | Wang et al. |
| 4,003,044 | 1/1977 | Richond, Jr. |
| 4,169,357 | 10/1979 | Kelley |
| 4,301,658 | 11/1981 | Reed ........................... 62/126 X |
| 4,313,308 | 2/1982 | Boratgis et al. ........... 62/127 X |

Primary Examiner—William E. Wayner
Attorney, Agent, or Firm—E. Harrison Gilbert, III

[57] ABSTRACT

A refrigeration system alarm device includes a temperature monitoring circuit which detects when a temperature within the refrigeration system exceeds a preselectable temperature reference level. The device also includes an alternating current power monitor circuit which detects when any one of a plurality of alternating current power inputs is interrupted. The device also includes a direct current power monitor circuit which includes a battery and a comparator circuit for determining when the voltage of the battery is below a predetermined level. When an excessive temperature is detected or an alternating current power input interruption is detected or the battery voltage is below the predetermined reference level, a visual or audible alarm signal is generated. If an alternating current power input interruption is detected, a control signal generated in response thereto controls a compressor control circuit to prevent a compressor of the refrigeration system from operating during the alternating current power interruption and a predetermined time period thereafter.

17 Claims, 2 Drawing Figures

REFRIGERATION SYSTEM ALARM DEVICE

BACKGROUND OF THE INVENTION

This invention relates generally to refrigeration system alarm apparatus and more particularly, but not by way of limitation, to monitoring and control apparatus which detect power outages and excessive temperatures in a food refrigerator or freezer.

When refrigerating or freezing food, one must be careful to insure that safe refrigerating or freezing temperatures are maintained to prevent food spoilage and loss due to excessive temperatures. Without some type of alarm device, this task of insuring safe operating temperatures can be difficult because defects which might cause such excessive temperatures might go unnoticed for periods of time during which the refrigerated or frozen food will spoil. These defects can arise from electrical or mechanical failures which are not readily detectable by one who only periodically opens the refrigerator or freezer to put in or take out food. Furthermore, when one opens the refrigerator or freezer, the door can be left ajar whereby the interior temperature can become excessive.

In addition to insuring that safe operating temperatures are maintained in a refrigeration system, it is also important to insure that the refrigeration equipment is properly operated to prevent equipment damage which might cost hundreds or thousands of dollars to repair. One type of equipment damage is that which may be caused in a compressor which is improperly actuated at a time during which the compressor has substantial internal pressure differentials. For example, the compressor might be operating with substantial internal pressure differentials when power to the compressor is lost. If power were relatively quickly restored and reapplied to the compressor, the compressor might be damaged through this rapid restart with the internal pressure differentials.

Therefore, there is the need for a device which monitors a refrigeration system to detect temperature and power anomalies, to give an alarm signal when such anomalies are detected, and to automatically protect the refrigeration equipment, such as the compressor, when such anomalies occur. Although many devices have been proposed to meet one or more of these needs, we know of no single device which meets these needs in the same manner as the present invention described hereinbelow.

SUMMARY OF THE INVENTION

The present invention fills the aforementioned needs by providing a novel and improved refrigeration system alarm device. This device monitors the refrigeration system to determine if the refrigeration temperatures exceed a predetermined temperature reference level. The present invention also monitors the various power inputs to determine if any is interrupted, and it controls the operation of equipment (such as a compressor) of the refrigeration system when an interruption and subsequent restoration of a power input occurs.

The present invention also meets the need of providing an alarm signal indicating that an excessive temperature or a power interruption has been detected.

Broadly, the present invention provides an alarm device comprising power monitor means for detecting when at least one of a plurality of inputs of electrical power is below a predetermined level. The alarm device also comprises alarm means, responsive to the power monitor means, for indicating that at least one of the inputs is below the predetermined level. The device still further comprises temperature monitor means for providing another actuating signal to the alarm means when a detected temperature exceeds a preselected reference level. The device also includes compressor control means for controlling the operation of a refrigeration compressor in response to a control signal generated in response to the detection by the power monitor means that an input of electrical power is below the predetermined level.

Therefore, from the foregoing, it is a general object of the present invention to provide a novel and improved refrigeration system alarm device. Other and further objects, features and advantages of the present invention will be readily apparent to those skilled in the art when the following description of the preferred embodiment is read in conjunction with the accompanying drawings.

DESCRIPTION OF THE PREFERRED EMBODIMENT

Figure 1:
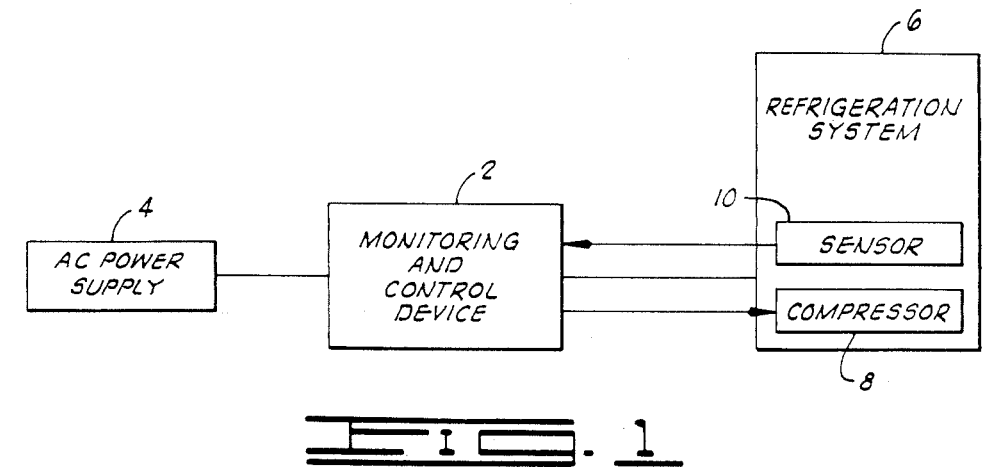
FIG. 1 is a block diagram of the monitoring and control device of the present invention shown associated with an alternating current power supply and a refrigeration system which includes a compressor and has a temperature sensor associated therewith.

With reference to the drawings, the preferred embodiment of the present invention will be described. FIG. 1 discloses that the present invention includes a monitoring and control device 2 which is primarily energized by an alternating current power supply 4. The power supply 4 of the preferred embodiment is a 110-VAC, 220-VAC, or three-phase power source as known to the art.

The monitoring and control device 2 is used to monitor and control a refrigeration system 6 which is also energized by the power supply 4. In the preferred embodiment of a 110-VAC residential model of the present invention, the refrigeration system 6 is plugged into or otherwise connected directly to the monitoring and control device 2 which is in turn plugged into or otherwise connected to the alternating current power supply 4. As used herein, "refrigeration system" includes, but is not limited to, equipment which maintains food at sub-freezing, freezing, or above-freezing temperatures.

The refrigeration system 6 includes a compressor 8 of a type as known to the art. For example, the compressor 8 may be of a type as found in a residential refrigerator or freezer or as found in a large commercial refrigeration installation. The compressor 8 is connected to the monitoring and control device 2 as indicated in FIG. 1 and as more fully described hereinbelow.

Associated with the refrigeration system 6 is a temperature sensor 10, such as a thermistor having a suitable operating range. The sensor 10 is connected to the monitoring and control device 2 as indicated in FIG. 1 and as more fully described hereinbelow.

Figure 2:
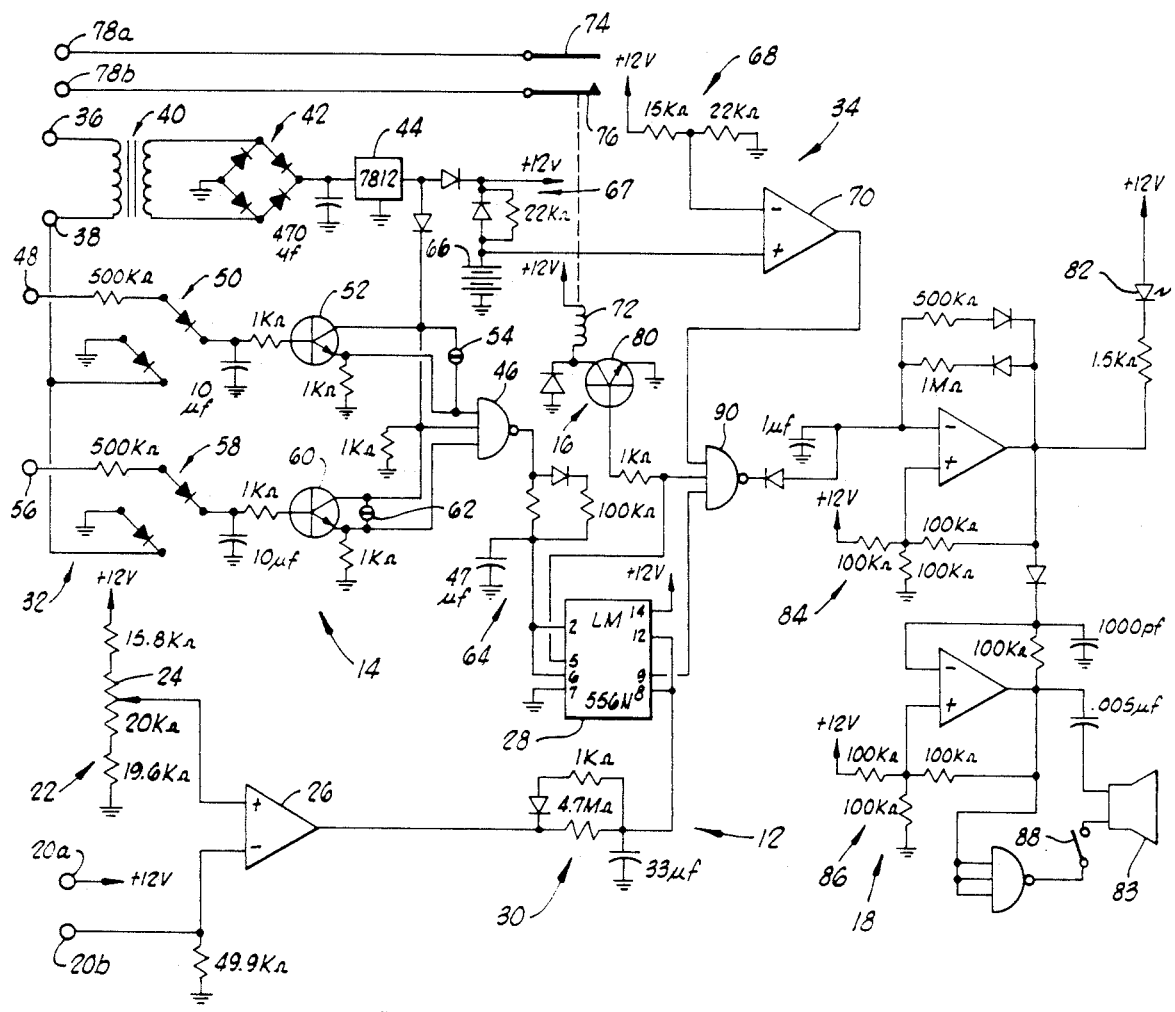
FIG. 2 is a schematic circuit diagram of the monitoring and control device depicted in FIG. 1.

The preferred embodiment of the monitoring and control device 2 comprises the electronic circuit schematically illustrated in FIG. 2. FIG. 2 discloses that the preferred embodiment circuit includes a temperature monitor circuit 12, a power monitor circuit 14, a compressor control circuit 16, and an alarm circuit 18.

The temperature monitor circuit 12 includes means for providing a control signal to the alarm circuit 18 when a temperature detected by the temperature sensor 10 exceeds a preselectable reference level. As shown in FIG. 2, the temperature monitor circuit 12 includes terminals 20a, 20b to which the thermistor constituting the preferred embodiment sensor means 10 is connectable. The sensor means 10 senses the actual temperature within the refrigeration system 6.

The temperature monitor circuit 12 further includes temperature reference level means for setting a reference level temperature against which the actual temperature detected by the sensor means 10 is compared. As shown in FIG. 2, the temperature reference level means includes a resistor network 22 including a potentiometer 24 by which a variable reference level can be established. In the preferred embodiment, the resistor network 22 allows a voltage representing a temperature within the range of zero to 50° Fahrenheit to be selected.

The temperature monitor circuit 12 further includes comparator means for generating a triggering signal when the sensed temperature exceeds the temperature reference level. In the preferred embodiment shown in FIG. 2, the comparator means is provided by an operational amplifier 26, such as is found in an integrated circuit LM324N. The inputs of the operational amplifier 26 are connected to the sensor terminal 20b and the resistor network 22. The output of the operational amplifier 26 is connected to a timer means for generating the control signal provided by the temperature monitor circuit 12 to the alarm circuit 18.

The timer means comprises another part of the temperature monitor circuit 12 and includes in the preferred embodiment one integrated circuit timer which forms a part of an integrated circuit timer chip identified in FIG. 2 by the reference numeral 28. The timer means also includes a resistor-capacitor network 30, which also has a diode in the preferred embodiment as shown in FIG. 2. The integrated circuit timer 28 and the resistor-capacitor network 30 provide means for delaying the generation of the control signal for a predetermined time period after the generation of the triggering signal by the operational amplifier 26 when the detected temperature exceeds the temperature reference level. In the preferred embodiment, the predetermined time period is from four to six minutes; however, other suitable periods of delay can be selected, such as by adjusting the values of the resistor-capacitor network 30.

The power monitor circuit 14 includes means for detecting when at least one of a plurality of inputs of electrical power is below a predetermined level. More particularly, the power monitor circuit 14 includes an alternating current power monitoring circuit 32 providing means for generating a control signal when at least one alternating current power input to the device 2 and the refrigeration system 6 is interrupted. The power monitor circuit 14 also includes a direct current power monitor circuit 34 which provides means for generating another control signal when a direct current power input is below a predetermined level.

The alternating current power monitor means 32 includes first power input means for receiving a first alternating current power input. As shown in FIG. 2, the preferred embodiment of the first power input means includes terminals 36, 38 to which a nominal 110-VAC power source or a first phase of a three-phase power system is connected. The first power input circuit also includes a transformer 40 having a first winding connected to the terminals 36, 38 and having a second winding connected to a full-wave rectifier 42 which rectifies the alternating current received from the transformer 40. The rectified signal from the rectifier 42 is provided to a voltage regulator 44 forming another part of the first power input circuit. The voltage regulator 44 provides means for connecting the rectifier 42 to a logic gate 46 forming another part of the alternating current power monitor circuit 32.

Still another part of the alternating current power monitor circuit 32 is a second power input means for receiving a second alternating current power input. In the preferred embodiment, the second power input means includes another terminal 48 to which a nominal 220-VAC power line is connectable in the preferred embodiment. Alternatively, a second phase of a three-phase power system can be connected to the terminal 48 in the preferred embodiment. The alternating current signal connected to the terminal 48 is rectified by a half-wave rectifier 50 which provides a rectified signal to a switch means comprising a transistor 52 in the preferred embodiment. Associated with the transistor 52 is a solder pad or strap 54 which is connectable between the collector and emitter of the transistor 52. The strap 54 is used to short-circuit the transistor 52 when only a 110-VAC or single-phase power input is used; the strap 54 is removed if the terminal 48 is used in either the 220-VAC or three-phase configuration of the preferred embodiment. When the strap 54 is removed, the transistor 52 switches between two logic states in response to the rectified signal from the rectifier 50. The transistor 52 switches to a first logic state (an "on" or conductive state in the preferred embodiment) when the alternating current power input connected to the terminal 48 has a voltage magnitude greater than a predetermined level established by the operating characteristics of the particular components used in the second power input means. The transistor 52 switches to a second logic state (an "off" or non-conductive state in the preferred embodiment) when the alternating current power input has a voltage magnitude below the predetermined level. The output provided by the transistor 52 is applied as an additional logic input to the logic gate 46.

The alternating current power monitoring circuit 32 still further includes third power input means for receiving a third alternating current power input. As shown in FIG. 2, the third power input means is constructed similarly to the second power input means in that the third power input means includes a terminal 56 to which a half-wave rectifier 58 is connected. The terminal 56 is utilized to receive the third phase of a three-phase system with which the preferred embodiment shown in FIG. 2 can be used. This third phase is rectified by the rectifer 58 whose rectified output is provided to a switch means comprising a transistor 60 in the preferred embodiment. Connectable between the collector and emitter of the transistor 60 is a strap or solder pad 62 which is used when only either a 110-VAC or 220-VAC power input is used. The strap 62 is removed when the present invention is utilized with a three-phase power system. The transistor 60 functions as a switch to switch between the aforementioned first logic state when the third phase has a voltage magnitude above a predetermined level established by the operating characteristics of the third power input means and the aforementioned second logic state when the third phase has a voltage magnitude below the predetermined level. These logic states provide an additional input to the logic gate 46.

The logic gate 46 of the preferred embodiment is shown in FIG. 2 as a three-input NAND gate which operates to provide a logic level output when at least one of the inputs thereto from the first, second or third power input means is interrupted (i.e., below a predetermined level in the preferred embodiment). The NAND gate provides another logic level output when none of the inputs is interrupted.

The alternating current power monitor circuit 32 still further includes timer means, responsive to the logic gate 46, for providing a control signal to the alarm means 18. This timer means is shown in FIG. 2 to include a resistor-capacitor network 64, which also has a diode in the preferred embodiment illustrated in FIG. 2, and another integrated circuit timer forming a part of the integrated circuit timer chip 28. When the logic gate 46 indicates that one of the power inputs has been interrupted, the resistor-capacitor network 64 and the integrated circuit timer of the chip 28 immediately provide the control signal which actuates an alarm signal by the alarm circuit 18. This control signal also immediately causes the compressor control circuit 16 to prevent the compressor 8 connected thereto from operating. That is, when a power interruption is detected, there is no delay similar to the delay generated by the temperature monitor circuit 12 prior to the actuation of the alarm circuit 18. However, after the logic gate 46 has indicated a power interruption and then switches its output to indicate that all power inputs are operational, the resistor-capacitor network 64 and the timer of the chip 28 delay the inhibition of the control signal for a predetermined time period to prevent the immediate restarting of the compressor 8 connected to the compressor control circuit 16. In the preferred embodiment, this period of inhibition or delay is approximately four to six minutes; however, any suitable time period can be selected, such as by changing the values of the components in the timer means of the alternating current power monitor means 32. This period of delay insures that there will be sufficient time for pressure equalization within the compressor 8 prior to its being restarted.

Whereas the alternating current power monitor means 32 monitors the alternating current power inputs applied to the present invention, the direct current power monitor circuit 34 provides a direct current back-up power source and the monitoring thereof to insure that the back-up power source is at a sufficient potential. In the preferred embodiment, the direct current power monitor circuit 34 includes a direct current source means for providing an electrical potential. This is shown in FIG. 2 as a battery 66 having a nominal voltage of nine volts. The battery 66 can be of the rechargeable type which can be charged through a resistor-diode circuit 67 as shown in FIG. 2.

The direct current power monitor circuit 34 also includes voltage reference level means comprising in the preferred embodiment a resistor network 68 which provides a predetermined voltage reference established by the values of the resistors of the resistor network 68 and of the applied voltage.

The direct current power monitor circuit 34 also includes comparator means comprising an operational amplifer 70. When the voltage of the battery 66 drops below the voltage reference level provided by the resistor network 68, the operational amplifier 70 provides another control signal which is used in the present invention to actuate the alarm circuit 18.

The compressor control circuit 16 provides means for controlling the operation of the compressor 8 in response to the control signal generated by the timer means of the alternating current power monitor circuit 32. The compressor control circuit 16 prevents the operation of the compressor 8 when the control signal is provided by the alternating current power monitor circuit 32.

The compressor control circuit 16 of the preferred embodiment shown in FIG. 2 includes a relay coil 72 which is electromagnetically associated with two relay contacts 74, 76. The relay contacts 74, 76 are connectable to the compressor 8 by suitable means, such as terminals 78a, 78b. The relay coil 72 is switched between energized and unenergized states through the operation of a switch comprising in the preferred embodiment a transistor 80 which is responsive to the control signal from the timer means of the alternating current power monitor circuit 32. In other words, the transistor 80 switches the relay coil 72 into and out of a relay energization circuit provided between the ground and the regulated voltage supply provided by the voltage regulator 44 as indicated in the preferred embodiment of FIG. 2.

It is contemplated that the compressor control circuit 16 can also be more generally used as a power interruptor or power application means for interrupting or applying power to equipment other than compressors.

The alarm circuit 18 provides means for indicating that (1) at least one of the power inputs, either one or more of the alternating current power inputs or the direct current power input, has been interrupted or is below a predetermined value or (2) that the temperature detected by the sensor 10 exceeds the preselectable temperature reference level established by the resistor network 22. The alarm circuit 18 includes a visual alarm means for providing a visible alarm signal. In a preferred embodiment, the visual alarm means includes a light-emitting diode 82. The alarm circuit 18 also includes an audible alarm means for providing an audible alarm signal. In the preferred embodiment, this is provided by a buzzer or speaker 83 of a type as known to the art.

The actuate the light-emitting diode 82 so that it flashes on and off to indicate an alarm condition, the alarm circuit 18 includes an oscillator means comprising the circuitry generally identified in FIG. 2 by the reference numeral 84. The actuate the buzzer 83 to periodically emit sounds, such as beeps, to indicate an alarm condition, the alarm circuit 18 includes another oscillator means comprising in the preferred embodiment the circuitry generally identified in FIG. 2 by the reference numeral 86. As shown in FIG. 2, the oscillator circuits 84 and 86 are electrically connected together. So that the audible alarm can be disconnected, and thereby prevented from emitting an alarm signal, the alarm circuit 18 includes a manual switch 88.

To enable the alarm circuit 18 to properly respond to the control signals generated by the temperature monitor circuit 12, the alternating current power monitor circuit 32 and the direct current power monitor circuit 34, the alarm circuit 18 further includes logic gate means shown in FIG. 2 as a three-input NAND gate 90 for the preferred embodiment. When a control signal (a low logic level in the preferred embodiment) is present at an input of the gate 90, the gate 90 provides an output (a high logic level in the preferred embodiment) to enable the oscillator circuits 84 and 86.

Although not shown in the drawings, it is contemplated that other features can be included in the monitoring and control device 2. For example, a digital temperature display can be included. As another example, a counter for indicating the number of times the alarm circuit is actuated can be included.

In operation, each of the monitor circuits (i.e., the temperature monitor circuit 12, the alternating current power monitor circuit 32 and the direct current power monitor circuit 34) monitors its respective input or inputs and generates a control signal when an anomaly in a monitored input is detected. Upon such detection, that circuit provides its respective control signal to the logic gate 90 whereupon the oscillators 84 and 86 are actuated. When the oscillator 84 is actuated, it flashes the light-emitting diode 82; when the oscillator 86 is actuated, it sounds the buzzer 83 if the switch 88 is closed. If the control signal which actuates the alarm circuit 18 is the control signal from the alternating current power monitor circuit 32, the control signal therefrom also opens the switch provided by the transistor 80 so that the relay coil 72 is de-energized and the relay contacts 74, 76 opened, thereby preventing the compressor 8 connected to the terminals 78a, 78b from operating or attempting to operate during the period of the power anomaly detected by the alternating current power monitor circuit 32. The relay contacts 74, 76 are maintained in their open state until the power anomaly has been corrected and the predetermined period of delay provided by the resistor-capacitor network 64 and the associated timer of the integrated circuit chip 28 has expired.

Through the operation of the present invention described hereinabove, the refrigeration system 6 is monitored to insure that safe refrigeration temperatures are maintained. Furthermore, the refrigeration equipment, such as the compressor 8, is controlled to reduce the chances of damage in the event of a power interruption. Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An alarm apparatus, comprising:
   power monitor means for detecting when at least one of a plurality of inputs of electrical power is below a predetermined level, said power monitor means including:
   first terminal means for receiving a first alternating current power input having a first nominal voltage or a first phase of a three-phase power system;
   second terminal means for receiving a second alternating current power input having a second nominal voltage or a second phase of said three-phase power system;
   third terminal means for receiving a third phase of said three-phase power system;
   first switch means for being switched to a first logic state when said second alternating current power input or said second phase has a voltage magnitude greater than said predetermined level or to a second logic state when said second alternating current power input or said second phase has a voltage magnitude less than said predetermined level;
   second switch means for being switched to the first logic state when said third phase has a voltage magnitude greater than said predetermined level or to the second logic state when said third phase has a voltage magnitude less than said predetermined level;
   logic gate means for indicating when either said first switch means or said second switch means is in said second state; and
   timer means, responsive to said logic gate means, for providing a control signal; and
   alarm means, responsive to said control signal, for indicating that at least one of said inputs is below said predetermined level.

2. The apparatus of claim 1, wherein said power monitor means further includes:
   direct current source means for providing an electrical potential; and
   comparator means for providing another control signal to said alarm means when said electrical potential is below a predetermined value.

3. The apparatus of claim 2, wherein said power monitor means still further includes:
   rectifier means for electrically rectifying said first alternating current power input or said first phase; and
   means for electrically connecting said rectifier means to said logic gate means.

4. The apparatus of claim 3, further comprising temperature monitor means for providing a further control signal to said alarm means when a detected temperature exceeds a preselectable reference level.

5. The apparatus of claim 1 further comprising compressor control means for controlling the operation of a refrigeration compressor in response to said control signal from said timer means.

6. The apparatus of claim 5, wherein said compressor control means includes:
   a relay coil;
   two relay contacts;
   means for connecting said two relay contacts to said refrigeration compressor; and
   third switch means, responsive to said control signal from said time means, for electrically connecting or disconnecting said relay coil into or out of a relay energization circuit.

7. An alarm apparatus for a refrigeration system having a compressor, said apparatus comprising:
   temperature monitor means for generating a first control signal when a temperature within said refrigeration system exceeds a preselectable temperature reference level;
   alternating current power monitor means for generating a second control signal when at least one alternating current power input to said refrigeration system is interrupted, said alternating current power monitor means including:
   first power input means for receiving a first alternating current power input, and first power input means including:
   first rectifier means for electrically rectifying said first alternating current power input; and voltage regulator means for regulating the magnitude of the rectified first alternating current power input;

second power input means for receiving a second alternating current power input, said second power input means including:
  second rectifier means for electrically rectifying said second alternating current power input; and
  first switch means responsive to the rectified second alternating current power input;

third power input means for receiving a third alternating current power input, said third power input means including:
  third rectifier means for electrically rectifying said third alternating current power input; and
  second switch means responsive to the rectified third alternating current power input;

logic means, electrically connected to said voltage regulator means, said first switch means and said second switch means, for providing a first logic level output when at least one of said alternating current power inputs is interrupted and for providing a second logic level output when none of said alternating current power inputs is interrupted; and timer means for generating said second control signal in response to said first logic level output and for inhibiting said second control signal in response to said second logic level output;

direct current power monitor means for generating a third control signal when a direct current power input within said alarm apparatus is below a predetermined level; and alarm means for generating an alarm signal in response to said first, second, or third control signals.

8. The apparatus of claim 7, wherein said timer means includes means for delaying the inhibiting of said second control signal for a predetermined time period after the second logic level output is provided by said logic means subsequent to said logic means providing said first logic level output.

9. The apparatus of claim 8, further comprising compressor control means, responsive to said timer means, for controlling the operation of said compressor.

10. The apparatus of claim 7, wherein said direct current power monitor means includes:
  a battery for providing said direct current power input;
  reference level means for setting a voltage reference level; and
  comparator means, responsive to said battery and said reference level means, for providing said third control signal.

11. An alarm apparatus for a refrigeration system having a compressor, said apparatus comprising:
  temperature monitor means for generating a first control signal when a temperature within said refrigeration system exceeds a preselectable temperature reference level;
  alternating current power monitor means for generating a second control signal when at least one alternating current power input to said refrigeration system is interrupted;
  direct current power monitor means for generating a third control signal when a direct current power input within said alarm apparatus is below a predetermined level; and alarm means for generating an alarm signal in response to said first, second, or third control signals, said alarm means including:
  visual alarm means for providing a visible alarm signal;
  audible alarm means for providing an audible alarm signal;
  first oscillator means for providing a first oscillating signal to said visual alarm means;
  second oscillator means for providing a second oscillating signal;
  switch means for switchably connecting said second oscillating signal to said audible alarm means; and
  logic means, responsive to said first, second and third control signals, for actuating said first and second oscillator means.

12. The apparatus of claim 11, further comprising compressor control means for preventing the operation of said compressor when said second control signal is generated by said alternating current power monitor means.

13. The apparatus of claim 12, wherein said alternating current power monitor means includes means for inhibiting the generation of said second control signal after a predetermined time delay from the time said alternating current power monitor means detects none of said alternating current power inputs is interrupted so that said compressor control means will not enable said compressor to operate until a period for pressure equalization within said compressor has been allowed.

14. An alarm apparatus for a refrigeration system having a compressor, said apparatus comprising:
  temperature monitor means for generating a first control signal when a temperature within said refrigeration system exceeds a preselectable temperature reference level, said temperature monitor means including:
    sensor means for sensing temperature in said refrigeration system;
    temperature reference level means for setting a temperature reference level;
    comparator means, responsive to said sensor means and said temperature reference level means, for generating a triggering signal when said sensed temperature exceeds said temperature reference level; and
    first timer means, responsive to said triggering signal, for generating said first control signal;
  alternating current power monitor means for generating a second control signal when at least one alternating current power input to said refrigeration system is interrupted, said alternating current power monitor means including:
    first power input means for receiving a first alternating current power input, said first power input means including:
      first rectifier means for electrically rectifying said first alternating current power input; and
      voltage regulator means for regulating the magnitude of the rectified first alternating current power input;
    second power input means for receiving a second alternating current power input, said second power input means including:

second rectifier means for electrically rectifying said second alternating current power input; and first switch means responsive to the rectified second alternating current power input;

third power input means for receiving a third alternating current power input, said third power input means including:

third rectifier means for electrically rectifying said third alternating current power input; and second switch means responsive to the rectified third alternating current power input;

logic means, electrically connected to said voltage regulator means, said first switch means and said second switch means, for providing a first logic level output when at least one of said alternating current power inputs is interrupted and for providing a second logic level output when none of said alternating current power inputs is interrupted; and second timer means for generating said second control signal in response to said first logic level output and for inhibiting said second control signal in response to said second logic level output;

direct current power monitor means for generating a third control signal when a direct current power input within said alarm apparatus is below a predetermined level; and alarm means for generating an alarm signal in response to said first, second, or third control signals.

15. The apparatus of claim 14, wherein:

said second timer means includes means for delaying the inhibiting of said second control signal for a predetermined time period after the second logic level output is provided by said logic means subsequent to said logic means providing said first logic level output; and said apparatus further comprises compressor control means, responsive to said second timer means, for controlling the operation of said compressor.

16. An alarm device for a refrigeration system having a compressor, said device comprising:

temperature sensor means for sensing a temperature within said refrigeration system;

first resistor means for providing a temperature reference level;

operational amplifier means having a first input connected to said temperature sensor means and having a second input connected to said resistor means and further having an output;

a first resistor-capacitor network connected to said output of said first operational amplifier;

a first integrated circuit timer having an input connected to said first resistor-capacitor network and further having an output;

first terminal means for receiving a first power input;

a transformer having a first winding connected to said first terminal means and having a second winding;

a first half-wave rectifier connected to said second winding;

a voltage regulator connected to said first half-wave rectifier;

second terminal means for receiving a second power input;

a second half-wave rectifier connected to said second terminal means;

a first transistor connected to said second half-wave rectifier;

third terminal means for receiving a third power input;

a third half-wave rectifier connected to said third terminal means;

a second transistor connected to said third half-wave rectifier;

a first logic gate having a first input connected to said voltage regulator, a second input connected to said first transistor, and a third input connected to said second transistor and further having an output;

a second resistor-capacitor network connected to said output of said logic gate;

a second integrated circuit timer having an input connected to said second resistor-capacitor network and further having an output;

a battery;

a second resistor means for providing a voltage reference level;

a second operational amplifier having an input connected to said battery and having another input connected to said second resistor means and further having an output;

a second logic gate having a first input connected to said output of said first integrated circuit timer, a second input connected to said output of said second integrated circuit timer, and a third input connected to said output of said second operational amplifier and further having an output;

a first oscillator circuit connected to said output of said second logic gate;

a light-emitting member responsive to said first oscillator circuit;

a second oscillator circuit electrically connected to said first oscillator circuit;

a sound-emitting member switchably connected to said second oscillator circuit;

a third transistor connected to said output of said second integrated circuit timer;

a relay coil connected to said third transistor;

switchable relay contacts, responsive to said relay coil, for opening and closing a circuit to which said compressor of said refrigeration system is connectable.

17. An alarm apparatus, comprising:

power monitor means for detecting when at least one of a plurality of inputs of electrical power is below a predetermined level, said power monitor means including:

first terminal means for receiving a first power input having a first nominal voltage or a first phase of a multi-phase power system;

second terminal means for receiving a second power input having a second nominal voltage or a second phase of said multi-phase power system;

switch means for being switched to a first logic state when said second alternating current power input or said second phase has a voltage magnitude greater than said predetermined level or to a second logic state when said second alternating current power input or said second phase has a voltage magnitude less than said predetermined level;

logic gate means for indicating when said switch means is in said second state; and timer means, responsive to said logic gate means, for providing a control signal; and alarm means, responsive to said control signal, for indicating that at least one of said inputs is below said predetermined level.

* * * * *